US011821152B2

(12) United States Patent
Repiscak et al.

(10) Patent No.: US 11,821,152 B2
(45) Date of Patent: Nov. 21, 2023

(54) SYSTEMS AND METHODS FOR ACTIVATING MACHINE COMPONENTS

(71) Applicant: Caterpillar Paving Products Inc., Brooklyn Park, MN (US)

(72) Inventors: Monica Repiscak, North St. Paul, MN (US); Terry Ray Stoe, Champlin, MN (US); Steven Paul Goutermont, Saint Michael, MN (US); Tobin Dale Rasmusson, Bloomington, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 670 days.

(21) Appl. No.: 16/688,503

(22) Filed: Nov. 19, 2019

(65) Prior Publication Data

US 2021/0148063 A1 May 20, 2021

(51) Int. Cl.
| | | |
|---|---|---|
| *E01C 19/40* | (2006.01) | |
| *B60R 16/03* | (2006.01) | |
| *E01C 19/28* | (2006.01) | |
| *E01C 23/12* | (2006.01) | |
| *E01C 23/088* | (2006.01) | |
| *E01C 19/48* | (2006.01) | |

(52) U.S. Cl.
CPC .............. *E01C 19/40* (2013.01); *B60R 16/03* (2013.01); *E01C 19/282* (2013.01); *E01C 23/088* (2013.01); *E01C 23/127* (2013.01); *E01C 19/4853* (2013.01); *E01C 2301/10* (2013.01)

(58) Field of Classification Search
CPC .... E01C 19/40; E01C 19/282; E01C 19/4853; E01C 2301/10; B60R 16/03
USPC ................................... 404/72–84.5, 95, 118
See application file for complete search history.

(56) References Cited

U.S. PATENT DOCUMENTS

| | | | |
|---|---|---|---|
| 6,334,735 B1* | 1/2002 | Williams ................ | E01C 19/48 700/19 |
| 7,290,517 B2 | 11/2007 | Marchand et al. | |
| 7,497,195 B2 | 3/2009 | Umezu et al. | |
| 8,517,628 B2 | 8/2013 | Weiser et al. | |
| 9,676,394 B2 | 6/2017 | Noll | |
| 9,869,063 B1* | 1/2018 | Brenner ................. | E01C 1/002 |
| 9,963,836 B1* | 5/2018 | Brenner ................. | E01C 19/42 |
| 10,144,390 B1 | 12/2018 | Chaston et al. | |
| 2016/0061755 A1* | 3/2016 | Delius ..................... | E01C 19/48 374/43 |

(Continued)

FOREIGN PATENT DOCUMENTS

| | | |
|---|---|---|
| CN | 104554087 A | 4/2015 |
| DE | 102016009235 A1 | 2/2018 |

*Primary Examiner* — Raymond W Addie
(74) *Attorney, Agent, or Firm* — Lee & Hayes, P.C.

(57) ABSTRACT

A method includes receiving first information indicative of a first selection of a machine disposed at a worksite, wherein the first information is received from an electronic device disposed remote from the worksite. The method also includes receiving second information from the electronic device, wherein the second information is indicative of a second selection of a component of the machine. The method further includes determining, using at least one sensor, that an area surrounding the machine is free from unknown objects, and receiving third information indicative of a request to activate the component. The method also includes causing activation of the component based at least in part on the third information.

20 Claims, 7 Drawing Sheets

(56) References Cited

U.S. PATENT DOCUMENTS

2016/0245785 A1\* 8/2016 Marsolek ................ E01C 19/48
2019/0106846 A1\* 4/2019 Marsolek ................ E01C 19/23
2019/0169804 A1\* 6/2019 Brammer ............... E01C 23/088
2019/0186094 A1\* 6/2019 Marsolek ................ E02D 3/046
2019/0338473 A1\* 11/2019 Buschmann ........ E01C 19/1068

\* cited by examiner

SYSTEMS AND METHODS FOR ACTIVATING MACHINE COMPONENTS

TECHNICAL FIELD

The present disclosure relates to systems and methods for activating machine components. More specifically, the present disclosure relates to systems and methods for remotely activating one or more components of a paving machine, a compaction machine, a cold planer, or other machines of a paving system.

BACKGROUND

A paving machine, such as an asphalt paver, is a self-propelled construction machine designed to receive, convey, distribute, profile, and partially compact paving material. Such a paving machine may accept heated paving material (e.g., asphalt) into a receiving hopper at the front of the paving machine. The heated asphalt material in the hopper is conveyed to the rear of the paving machine by conveyors positioned at a base of the hopper. The asphalt material is then distributed across a width of the paving machine by means of two opposing screws or augers. Finally, a screed assembly located at the rear of the paving machine profiles and compacts the asphalt material into a mat on a paving surface. Typically, one or more additional pieces of paving equipment, such as a cold planer, will remove a top layer of a roadway or other such work surface in order to expose the paving surface on which the mat is placed. Further, one or more compaction machines typically follow the paving machine in order to compress the mat to a desired stiffness.

Operators are typically required to activate certain components of the paving machine, the compaction machine, and/or other paving system machines before a paving operation begins. For instance, an operator may activate a heating assembly associated with the screed assembly in order to elevate the temperature of a screed plate or other screed assembly components before asphalt is delivered to the screed assembly. Similarly, the operator may activate one or more pumps or other hydraulic components of the paving machine in order to elevate the temperature of engine oil or other hydraulic fluid prior to operation. Depending on the ambient temperature and other weather conditions, it may take an hour or more to elevate the temperature of such components to a desired operating temperature. As a result, in some situations, paving operations may be delayed to allow for various machine components to reach respective operating temperatures, and the efficiency of the overall paving system may be hindered.

An example vehicle start system is described in U.S. Pat. No. 10,144,390 (hereinafter referred to as the '390 patent). In particular, the '390 patent describes a system associated with a work vehicle and configured to automatically activate certain components of the work vehicle. As explained in the '390 patent, an automatic start operation may precondition a cab of the work vehicle prior to arrival of the operator. In such examples, when a cab temperature or an ambient temperature reaches a predetermined threshold, the vehicle start system may generate a start command to activate a climate control system of the work vehicle, thereby heating or cooling the cab. The '390 patent does not, however, describe a system configured to activate various components of a machine based at least in part on information received from a separate electronic device disposed remote from the worksite and via a network. In particular, the '390 patent does not describe a system in which an operator may activate one or more components of a machine using an electronic device that is out of range of various local, near-field, or other relatively short-range network protocols.

Example embodiments of the present disclosure are directed toward improving upon the various paving systems described above.

SUMMARY

In an aspect of the present disclosure, a method includes receiving first information indicative of a first selection of a machine disposed at a worksite, wherein the first information is received, by a controller, from an electronic device disposed remote from the worksite and via a network. The method also includes receiving second information with the controller and from the electronic device, wherein the second information is indicative of a second selection of a component of the machine. The method further includes determining, with the controller and using at least one sensor, that an area surrounding the machine is free from unknown objects. The method also includes receiving third information with the controller and from the electronic device, wherein the third information is indicative of a request to activate the component. Additionally, the method includes causing activation of the component with the controller and based at least in part on the third information.

In another aspect of the present disclosure, a paving system includes a paving machine disposed at a worksite, the paving machine having a first controller, a screed portion, a heating system associated with the screed portion, a power source, and a plurality of hydraulic components driven by the power source. Such an example paving system also includes a second controller separate from the paving machine and in communication with the first controller via a network. In such examples, the second controller is configured to receive first information indicative of a first selection the paving machine, wherein the first information is received from an electronic device disposed remote from the worksite and via the network. The second controller is also configured to receive second information from the electronic device, wherein the second information is indicative of a second selection of a component of the paving machine, and the component comprises at least one of the heating system and a pump of the plurality of hydraulic components. In such examples, the second controller is further configured to receive third information from the electronic device, wherein the third information is indicative of a request to activate the component. The second controller is also configured to receive fourth information from a sensor connected to the machine and via the network, wherein the fourth information is indicative of an area surrounding the paving machine. Additionally, the second controller is configured to provide instructions to the first controller based at least in part on the third information and the fourth information, the instructions being executable by the first controller to activate the component.

In yet another aspect of the present disclosure, a paving machine includes a first controller, a screed portion configured to deposit a mat of paving material onto a work surface of a work site, a heating system associated with the screed portion and operably connected to the first controller, a power source operably connected to the first controller, a plurality of hydraulic components driven by the power source, at least one sensor operably connected to the first controller, and a communication device operably connected to the first controller. In such examples, the communication device is in communication with a second controller separate from the paving machine via a network. The second controller is configured to receive first information from an electronic device disposed remote from the worksite and via the network. In such examples, the first information is indicative of a first selection of a component of the paving machine, and the component comprises at least one of the heating system and a pump of the plurality of hydraulic components. The second controller is also configured to receive second information from the electronic device, wherein the second information is indicative of a request to activate the component. Additionally, the second controller is configured to receive third information from the at least one sensor, wherein the third information is indicative of an area surrounding the paving machine. The second controller is also configured to provide instructions to the first controller based at least in part on the first information, the second information, and the third information. The first controller is configured to execute the instructions, and execution of the instructions by the first controller causes the first controller to activate the component.

DETAILED DESCRIPTION

Wherever possible, the same reference numbers will be used throughout the present disclosure to refer to the same or like parts. In example embodiments, the systems and methods described herein may be utilized in order to activate one or more components of a machine that is disposed at a worksite, based at least in part on signals, instructions, and/or other information that is received from an electronic device disposed remote from the worksite. In some examples, the electronic device may comprise a laptop, tablet, cellular phone, or other device of an operator, and the electronic device may be disposed at a location that is outside of a perimeter of the worksite and/or that is outside of the range of a local area network (LAN), wide area network (WAN), Bluetooth® protocol, near-field communication (NFC) protocol, or other relatively short-range communication protocol. For instance, in various examples, the electronic device may be disposed one or more miles away from a perimeter of the worksite and/or from the second controller, and may be in communication with at least the second controller via an internet communication protocol or other relatively long-range wireless network.

In any of the examples described herein, delays associated with starting up/warming up various machine components may be avoided, and system efficiency can be improved, since the example systems and methods described herein enable the activation of such components while the operator is disposed remote from the worksite (e.g., before the operator arrives at the worksite). Examples of such systems, machines, components, and methods will be described in further detail below with respect to FIGS. 1-7.

Figure 1:
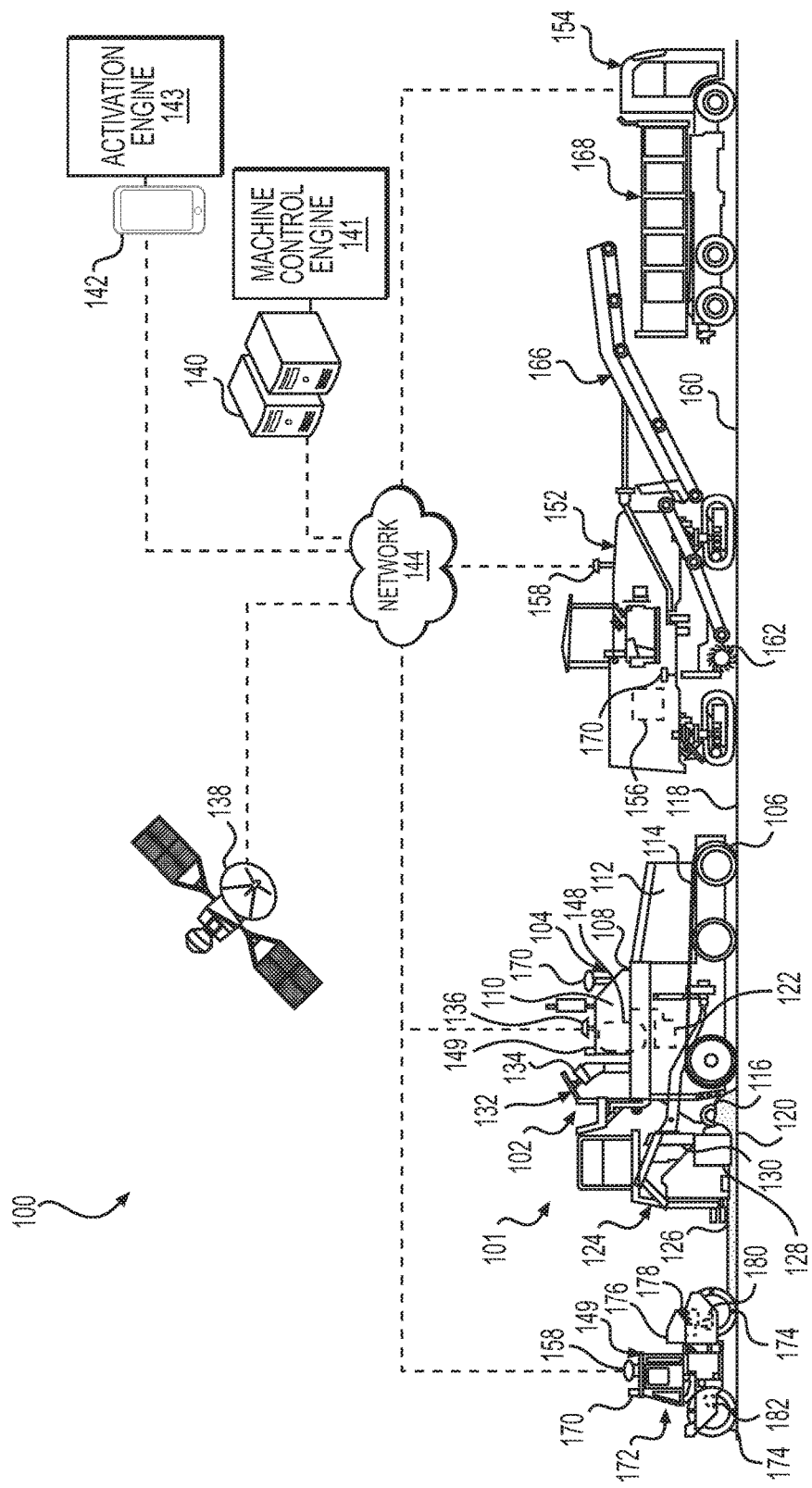
FIG. 1 is a perspective view of a system (e.g., a paving system) in accordance with an example embodiment of the present disclosure. The example system shown in FIG. 1 includes a paving machine, a cold planer, and a compaction machine.

FIG. 1 shows an example system 100 (e.g., a paving system 100) of the present disclosure disposed at an example worksite 101. The example paving system 100 includes at least one example machine 102 configured for use in one or more excavating, hauling, compacting, paving, or other such processes at the worksite 101. The machine 102 is illustrated as a paving machine 102 which may be used, for example, for road or highway constructions, and other allied industries. Alternatively, the machine 102 may be any other machine used for laying asphalt, concrete, or like materials.

The illustrated paving machine 102 includes a tractor portion 104 supported on a set of ground-engaging elements 106. The tractor portion 104 includes a tractor frame 108, as well as a power source 110 for driving the ground-engaging elements 106. Although the ground engaging elements 106 are illustrated as wheels, it should be understood that the ground engaging elements 106 may be any other type of ground engaging elements such as, for example, continuous tracks, etc. The power source 110 may be a conventional internal combustion engine operating on fossil or hybrid fuels (e.g., gasoline, compressed natural gas, diesel fuel, etc.), or an electrically operated drive powered by alternate energy sources (e.g., fuel cell, battery, solar power, etc.). The paving machine 102 also includes a hopper 112 for storing paving material. The paving machine 102 further includes a conveyor system 114 for conveying the paving material from the hopper 112 to other downstream components of the paving machine 102. For example, the paving machine 102 may include an auger assembly 116 which receives the paving material supplied via the conveyor system 114, and distributes the paving material onto a paving surface 118. Such paving material is illustrated as item 120 in FIG. 1.

In the example shown in FIG. 1, the auger assembly 116 includes at least one main auger. In some embodiments, the auger assembly 116 may include a main auger, and an auger extension coupled to the main auger via an auger bearing or other coupling component. In further examples, the auger assembly 116 may include a main auger and an additional auger disposed opposite the main auger. In such examples, the main auger and the additional auger may be configured to distribute the paving material 120 across substantially an entire width of the paving machine 102. The paving machine 102 may further include a tow arm which couples a height adjustable screed portion 124 to the tractor portion 104. The tow arm may be actuated by a hydraulic actuator, an electric actuator (not shown), and/or any other type of actuator as per application requirements, and raising or lowering the tow arm may result in commensurate raising or lowering of the screed portion 124. For instance, the paving machine 102 may include one or more hydraulic pumps, hydraulic cylinders, hydraulic actuators, and/or other hydraulic components 122, and at least one of the hydraulic components 122 may be coupled to the tractor frame 108 and/or to the tow arm described above. In such examples, at least one of the hydraulic components 122 may be configured to raise, lower, actuate, and/or otherwise move the tow arm relative to the tractor frame 108, thereby causing commensurate movement of the screed portion 124 and/or components thereof. As will be described below, such hydraulic components 122 may further include one or more propulsion pumps, one or more pumps connected to the auger assembly 116, one or more pumps connected to the conveyor system 114, one or more tamper bar pumps, one or more fan pumps, one or more engine oil pumps, one or more engine coolant pumps, one or more pumps connected to a stick, boom, bucket, tool, or other component of a machine, and/or other such pumps.

The screed portion 124 may include one or more augers, rollers, and/or other components configured to assist in spreading and/or compacting the paving material 120 into a mat 126 on the paving surface 118. The screed portion 124 may also include first and second end gates configured to define the width of the mat 126. For example, the screed portion 124 may include a first end gate located on a right-hand side of the paving machine 102 and a second end gate located on a left-hand side of the paving machine 102 opposite the right-hand side. The screed portion 124 may be configured to spread and/or compact the paving material 120 substantially evenly from the first end gate to the second end gate when forming the mat 126. The screed portion 124 may further include a screed plate 128 and a heating system 130 coupled to, thermally connected to, and/or otherwise associated with the screed plate 128. The screed plate 128 may extend, substantially horizontally, between the first end gate and the second end gate of the screed portion 124, and may be configured to at least partially compress the paving material 120 (e.g., in a substantially vertical direction) downward onto the paving surface 118 of the worksite 101 as the mat 126 is formed.

The heating system 130 may include, for example, one or more electronic heat plates, heat coils, or other components configured to increase the temperature of the screed plate 128 to a desired operating temperature. For example, the heating system 130 may include an electronic heat plate operably connected to a battery, generator, and/or other source of electronic power. In such example, the electronic heat plate may be activated by directing electronic power thereto, and the heat plate may be controlled to obtain and/or maintain a desired temperature during operation. Controlling the heat plate and/or other components of the heating system 130 in this way may cause a commensurate increase in a temperature of the screed plate 128, and may cause the screed plate 128 to obtain and/or maintain a desired temperature during operation. In some examples, such a desired temperature of the screed plate 128 may be between approximately 200 degrees Fahrenheit and approximately 350 degrees Fahrenheit. Alternatively, in other examples, such a desired temperature may be greater than or less than the temperatures noted above.

With continued reference to FIG. 1, an operator station 132 may be coupled to the tractor portion 104. The operator station 132 may include a console 134 and/or other levers or controls for operating the paving machine 102. For example, the console 134 may include a control interface for controlling various functions of the paving machine 102. The control interface may comprise an analog, digital, and/or touchscreen display, and such a control interface may be configured to display, for example, at least part of a map of the paving surface 118, a travel path associated with the paving machine 102, one or more alerts, requests, or other information provided to an operator of the paving machine 102, boundaries, centerlines, or other information associated with a portion of the paving surface 118 acted on by one or more other machines of the paving system 100, and/or other information. The control interface may also support other functions including, for example, sharing various operating data with one or more other machines of the paving system 100.

As shown, the paving machine 102 also includes a communication device 136. The communication device 136 may comprise one or more receivers, transmitters, antennae, transceivers, and/or other components configured to enable the paving machine 102 to communicate with the one or more other machines of the paving system 100, with one or more servers, processors, controllers, computing devices, electronic devices, or control systems located at the worksite 101 and/or remote from the worksite 101. For example, the communication device 136 may comprise a transceiver configured transmit data, signals, and/or other information from the paving machine 102 to a processor, server, or other controller 140 separate from the paving machine 102, and such a communication device 136 may also be configured to receive data, signals, and/or other information from such a separate processor, server, or other controller 140. In such examples, the communication device 136 may also be configured to transmit data, signals, and/or other information from the paving machine 102 to one or more tablets, computers, cellular/wireless telephones, personal digital assistants, mobile devices, or other electronic devices 142 located at the worksite 101 and/or disposed remote from the worksite 101.

Additionally, in some examples, the communication device 136 may be configured to assist in determining a location of the paving machine 102, and may include and/or comprise a component of a global positioning system (GPS), a universal total stations (UTS) system, or other system configured to assist in determining the position and/or location of the paving machine 102. For example, the communication device 136 may be in communication with one or more GPS satellites 138 and/or UTS system components to determine a location of the paving machine 102 continuously, substantially continuously, or at various time intervals. One or more additional machines of the paving system 100 may also be in communication with the one or more GPS satellites 138 and/or UTS, and such GPS satellites 138 and/or UTS may also be configured to determine respective locations of such additional machines.

In any of the examples described herein, the communication device 136 may be connected to and/or otherwise in communication with such controllers 140 and/or electronic devices 142 via a network 144. The network 144 may be a LAN, a larger network such as a WAN, or a collection of networks, such as the Internet. Protocols for network communication, such as TCP/IP, may be used to implement the network 144. Although embodiments are described herein as using a network such as the Internet, other distribution techniques may be implemented that transmit information via memory cards, flash memory, or other portable memory devices.

In any of the examples described herein, the network 144 may be configured to facilitate communication between, for example, an electronic device 142 disposed outside of a perimeter of and/or otherwise remote from the worksite 101 and the controller 140. In some examples, the network 144 may enable the transfer of data, signals, and/or other information between the controller 140 and an electronic device 142 that is outside of the range of a LAN, WAN, Bluetooth® protocol, NFC protocol, or other relatively short-range communication protocol established at the worksite 101. For instance, in various examples, the electronic device 142 may be disposed one or more miles away from a perimeter of the worksite 101, from the paving machine 102 and/or other machines of the paving system 100, and/or from the controller 140. In such examples, the electronic device 142 may be in communication with at least the controller 140 via an Internet communication protocol or other relatively long-range wireless protocol via the network 144.

In such examples, the controller 140 may include a machine control engine 141 and the electronic device 142 may include an activation engine 143. The machine control engine 141 may comprise a hardware component of the controller 140, a software component (e.g., an executable program, module, set of instructions, or other logic-based component of the controller 140 stored in a memory associated with the controller 140) of the controller 140, and/or a combination thereof. Similarly, the activation engine 143 may comprise a hardware component of the electronic device 142, a software component (e.g., an executable program, module, set of instructions, or other logic-based component of the electronic device 142 stored in a memory associated with the electronic device 142) of the electronic device 142, and/or a combination thereof. The activation engine 143 may be configured to, for example, generate one or more user interfaces and provide such user interfaces via a display of the electronic device 142. Such user interfaces may be configured to receive one or more inputs from a user of the electronic device 142, and to transmit signals, data, and/or other information indicative of such inputs to the machine control engine 141 via the network 144. As will be described below, the machine control engine 141 and/or other components of the controller 140 may be configured to cause activation of one or more components of the paving machine 102 and/or other machines of the system 100 based at least in part on such information.

With continued reference to FIG. 1, the paving machine 102 may also include a controller 148 operably connected to and/or otherwise in communication with the screed portion 124, the power source 110, the conveyor system 114, the auger assembly 116, the hydraulic components 122, the heating system 130, the console 134, the communication device 136, and/or other components of the paving machine 102. The controller 148 may be a single controller or multiple controllers working together to perform a variety of tasks. The controller 148 may embody a single or multiple processors, microprocessors, field programmable gate arrays (FPGAs), digital signal processors (DSPs), and/or other components configured to calculate and/or otherwise determine one or more operating parameters of the paving machine 102 based at least in part on information received from the one or more other machines of the paving system 100, paving machine operating information received from an operator of the paving machine 102, one or more signals received from the GPS satellites 138, data, signals, instructions, and/or other information received from the controller 140, data, signals, instructions, and/or other information received from the electronic device 142, and/or other information. Numerous commercially available processors can be configured to perform the functions of the controller 148. Various known circuits may be associated with the controller 148, including power supply circuitry, signal-conditioning circuitry, actuator driver circuitry (i.e., circuitry powering solenoids, motors, or piezo actuators), and communication circuitry. In some embodiments, the controller 148 may be positioned on the paving machine 102, while in other embodiments the controller 148 may be positioned at an off-board location and/or remote location relative to the paving machine 102. The present disclosure, in any manner, is not restricted to the type of controller 148 or the positioning of the controller 148 relative to the paving machine 102. In any of the examples described herein, the operating parameters and/or any other information determined, processed, calculated, or generated by the controller 148 may be provided to the one or more additional machines, the controller 140, and/or electronic devices 142 via the network 144. Similarly, any of the information received by the controller 148 may be received from the controller 140, an electronic device 142, and/or from one or more additional machines of the paving system 100 via the network 114 and/or the communication device 136.

The paving machine 102 may also include one or more sensors connected thereto and configured to sense an area surrounding the paving machine 102. For example, the one or more sensors 149 may include, among other things, a video camera, a thermal camera, an infrared camera, a proximity sensor, a SONAR sensor, a RADAR sensor, a LIDAR sensor, and/or other sensors, configured to sense, identify, detect, and/or observe one or more objects disposed proximate the paving machine. In some examples, the paving machine 102 may include one or more of the sensors noted herein so as to sense, identify, detect, and/or observe one or more objects disposed within an area surrounding the paving machine 102, and in such examples, the area may be defined by a field of view (or, for example, a combination of the respective fields of view) of the one or more sensors 149. In any of the examples described herein, the one or more sensors 149, either individually or in combination, may be configured to provide information to the controller 140, via the network 144. In such examples, such information may be indicative of the area surrounding the paving machine 102. Using image recognition software and/or other object detection software, the controller 140 may be configured to process such information and determine whether the area surrounding the paving machine 102 is free from unknown objects.

As shown in FIG. 1, the paving system 100 may further include one or more cold planers 152 and/or one or more haul trucks 154. In such examples, a cold planer 152 may include a controller 156 that is substantially similar to and/or the same as the controller 148 described above with respect to the paving machine 102. In such examples, the controller 156 of the cold planer 152 may be in communication with the controller 148 of the paving machine 102 via the network 144. For example, the cold planer 152 may include a communication device 158 configured to send information to the communication device 136 of the paving machine 102 and/or receive information from the communication device 136 of the paving machine 102 via the network 144.

The cold planer 152 may further include one or more rotors having ground-engaging teeth, bits, or other components configured to remove at least a portion of the roadway, pavement, asphalt, concrete, gravel, dirt, sand, or other materials of a work surface 160 on which the cold planer 152 is disposed. For example, in any of the examples described herein, the cold planer 152 may include a single rotor 162 that may be lowered into contact with the work surface 160 by the cold planer 152. In such examples, the rotor 162 of the cold planer 152 may be rotated in a clockwise and/or counterclockwise direction relative to a frame of the cold planer 152 as respective ground-engaging teeth, bits, or other components of the rotor 162 contact the work surface 160 to remove a portion thereof and to reveal the paving surface 118. Alternatively, in some examples the rotor 162 may comprise a first rotor 162 of the cold planer 152. In such examples, first rotor 162 may be located on a right-hand side of the cold planer 152, and the cold planer 152 may also include a second rotor (obscured from view in FIG. 1) located on a left-hand side of the cold planer 152 opposite the right-hand side. The first and second rotors may be lowered into contact with the work surface 160 by the cold planer 152, and may be rotated in a clockwise and/or counterclockwise direction relative to a frame of the cold planer 152 as respective ground-engaging teeth, bits, or other components of the first and second rotors 162, 164 are in contact with the work surface 160. As a result of such rotation, in combination with force applied to the work surface 160 by the one or more rotors of the cold planer 152 in a substantially downward direction (e.g., away from the frame of the cold planer 152 and substantially vertically toward the work surface 160), portions of the work surface 160 may be removed by the cold planer 152 to reveal the paving surface 118. The cold planer 152 may also include a conveyor system 166 configured to transport removed portions of the work surface 160 from proximate the rotor 162 (or from proximate the first and second rotors) to a bed 168 of the haul truck 154.

As shown in FIG. 1, the cold planer 152 may further include one or more GPS sensors or other like location sensors 170 configured to determine a location of the cold planer 152 and/or components thereof. A location sensor 170 connected to the frame of the cold planer 152 may be configured to determine GPS coordinates (e.g., latitude and longitude coordinates), grid coordinates, a map location, and/or other information indicative of the location of the cold planer 152, in conjunction with the one or more GPS satellites 138 described above. As shown in FIG. 1, one or more like location sensors 170 may also be connected to the paving machine 102, and operably connected to the controller 148.

With continued reference to FIG. 1, the paving system 100 may further include one or more compaction machines 172 configured to compress the mat 126 of paving material 120 to a desired density and/or stiffness. In some examples, the compaction machine 172 may comprise a "breakdown" compactor having a breakdown drum and/or other such drums 174. In such examples, the compaction machine 172 may be configured to follow relatively closely behind the paving machine 102, such that the drums 174 can compact paving material 120 distributed by the paving machine 102 while the paving material 120 is still relatively hot. Compacting with the compaction machine 172 when the paving material 120 is still relatively hot allows the drums 174 of the compaction machine 172 to perform a relatively large proportion of the total compaction desired for a particular lift of paving material 120, as relatively hotter asphalt in the paving material 120 can flow relatively readily and is thus readily compacted.

Additionally or alternatively, one or more compaction machines 172 of the paving system 100 may comprise an "intermediate" compactor, and may include one or more intermediate drums 174 which compact paving material 120 already compacted at least once by an additional compaction machine 172. In still further examples, one or more compaction machines 172 of the paving system 100 may comprise a "finishing" compactor, and may include one or more finishing drums 174 configured to perform a final squeeze of the paving material 120.

In addition to the one or more sensors 149, the communication device 158, and the location sensor 170 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by one or more of the drums 174. The compaction machine 172 may also include a power source 176 that is substantially similar to the power source 110 described above with, for example, the paving machine 102. For example, the power source 176 of the compaction machine 172 may be configured to drive rotation of one or more of the drums 174, thereby causing commensurate movement of the compaction machine 172. In such examples, the power source 176 may comprise a conventional internal combustion engine operating on fossil or hybrid fuels (e.g., gasoline, compressed natural gas, diesel fuel, etc.), or an electrically operated drive powered by alternate energy sources (e.g., fuel cell, battery, solar power, etc.).

The compaction machine 172 may also include one or more hydraulic components 178 operably connected to a controller 180 of the compaction machine 172. Such hydraulic components 178 may be substantially similar to and/or the same as various hydraulic components 122 of the paving machine 102, and the controller 180 may be substantially similar to and/or the same as the controller 148 of the paving machine 102. For example, the hydraulic components of the compaction machine 172 may include one or more hydraulic pumps, hydraulic cylinders, hydraulic actuators, propulsion pumps, fan pumps, engine oil pumps, engine coolant pumps, and/or other such hydraulic devices. Additionally, similar to the controller 148 described above, the controller 180 of the compaction machine 172 may comprise a single or multiple processors, microprocessors, FPGAs, DSPs, and/or other components configured to calculate and/or otherwise determine one or more operating parameters of the compaction machine 172 based at least in part on information received from the one or more other machines of the paving system 100, operating information received from an operator of the compaction machine 172, one or more signals received from the GPS satellites 138, data, signals, instructions, and/or other information received from the controller 140, data, signals, instructions, and/or other information received from the electronic device 142, and/or other information.

Further, the compaction machine 172 may include one or more vibration components configured to cause vibration of one or more of the drums 174. In such examples, the vibration component 182 may be operably connected to the controller 180 and may be coupled to the one or more drums 174. Such vibration components may comprise one or more hydraulic actuators, electronic actuators, pneumatic actuators, and/or other actuators configured to vibrate within a range of desired amplitudes and/or intensities so as to cause commensurate vibration of the one or more drums 174.

Figure 2:
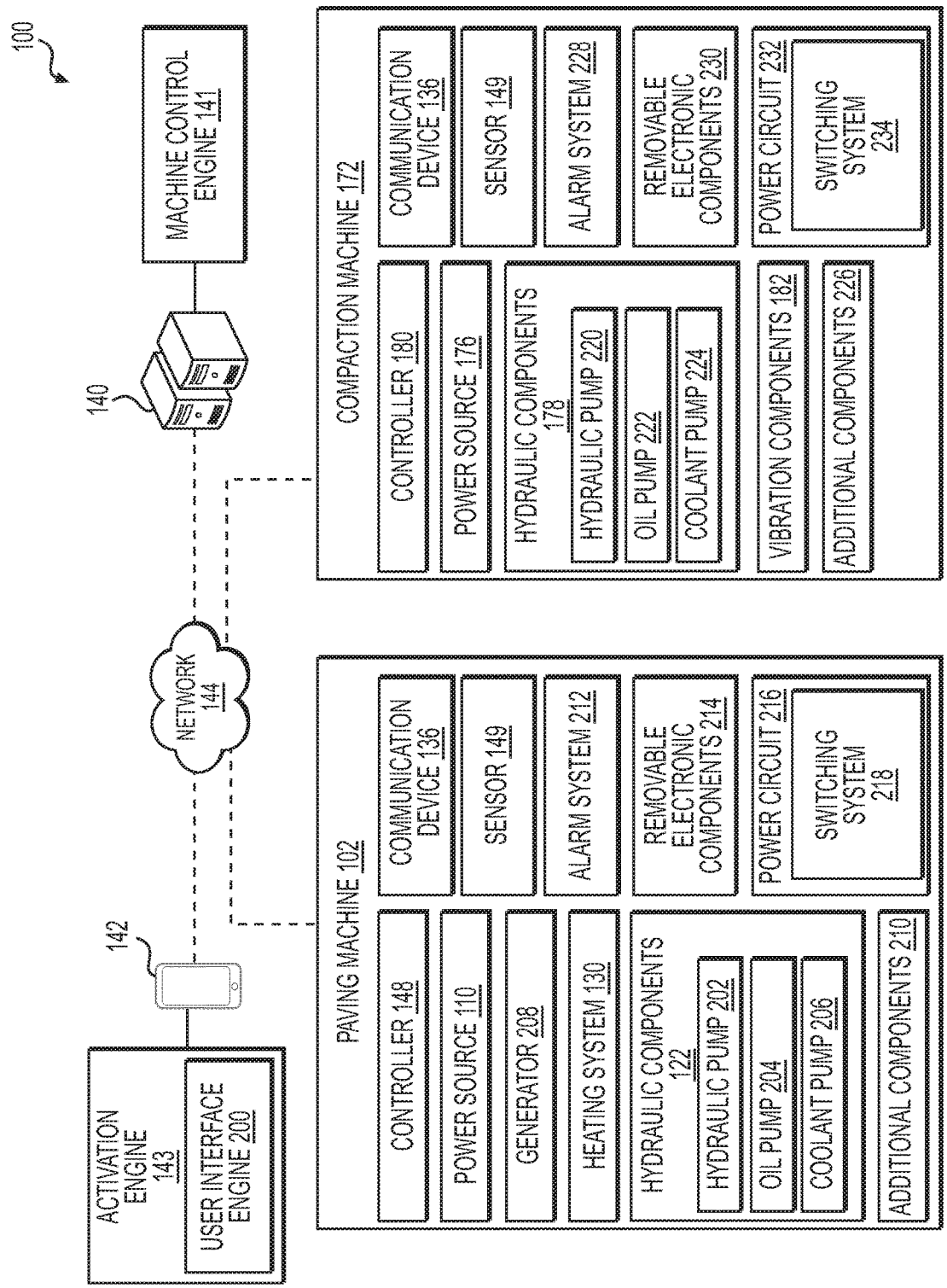
FIG. 2 is a schematic illustration of a paving machine and a compaction machine, operably connected to a controller, in accordance with an example embodiment of the present disclosure.

FIG. 2 provides a schematic illustration of various components of the paving system 100. In particular, FIG. 2 provides a schematic illustration of the controller 140, the electronic device 142, the paving machine 102, and the compaction machine 172. Although not illustrated in FIG. 2, it is understood that an example paving system 100 may also include one or more additional machines (e.g., cold planer 152, haul truck 154, etc.), and that any of the descriptions included herein with respect to FIG. 2 may also apply to such machines. As shown in FIG. 2, and as note above, the electronic device 142 may include the activation engine 143. For example, the electronic device 142 may include a processor, a microprocessor, and/or any other such controller that operates in a logical fashion to perform operations, execute control algorithms, store and retrieve data and other desired operations. The electronic device 142 may include or access memory, secondary storage devices, processors, and any other components for running an application. The memory and secondary storage devices may be in the form of read-only memory (ROM) or random access memory (RAM) or integrated circuitry that is accessible by the electronic device 142. Various other circuits may be associated with the electronic device 142 such as power supply circuitry, signal conditioning circuitry, driver circuitry, and other types of circuitry. Additionally, the activation engine 143 may comprise a component of the electronic device 142 (e.g., a software component of the electronic device 142 stored in the memory noted above).

In any of the examples described herein, the activation engine 143 may include a user interface engine 200. Similar to the activation engine 143, the user interface engine 200 may comprise a hardware component of the electronic device 142, a software component (e.g., an executable program, module, set of instructions, or other logic-based component of the electronic device 142 stored in a memory associated with the electronic device 142) of the electronic device 142, and/or a combination thereof. The user interface engine 200 may be configured to, for example, generate one or more user interfaces and provide such user interfaces via a display of the electronic device 142. Such user interfaces may be configured to receive one or more inputs from a user of the electronic device 142, and to transmit signals, data, and/or other information indicative of such inputs to the machine control engine 141 via the network 144. It is understood that the machine control engine 141 and/or other components of the controller 140 may be configured to cause activation of one or more components of the paving machine 102 and/or other machines of the system 100 based at least in part on such information. It is also understood that, similar to the electronic device 142, the controller 140 may include or access memory, secondary storage devices, processors, and any other components for running an application. Such memory and secondary storage devices may be in the form of ROM, RAM, and/or integrated circuitry that is accessible by the controller 140. In such examples, the machine control engine 141 may comprise a component of such memory.

With continued reference to FIG. 2, and as noted above with respect to FIG. 1, the example paving machine 102 may include various components including one or more of the controller 148, the communication device 136, the power source 110, the sensor 149, the heating system 130, and various hydraulic components 122. In some examples, the hydraulic components 122 may include one or more hydraulic pumps 202, oil pumps 204, coolant pumps 206, and/or other hydraulic components configured to provide desired functionality to the paving machine 102. For example, such hydraulic components 122 may include one or more hydraulic cylinders, hydraulic actuators, propulsion pumps, one or more pumps connected to the auger assembly 116, one or more pumps connected to the conveyor system 114, one or more tamper bar pumps, one or more fan pumps, and/or one or more additional pumps connected to a moveable component of the paving machine 102. In any of the examples described herein, the hydraulic pump 202, oil pump 204, coolant pump 206, and/or any of the other hydraulic components 122 may be coupled to, driven by, and/or otherwise connected to the power source 110. For example, any of the hydraulic components 122 described herein may be coupled to an output shaft and/or other driven component of the power source 110. In such examples, activation of the power source 110 and/or other operation of the power source 110 causing rotation of such an output shaft thereof, may cause commensurate activation of the one or more hydraulic components 122 connected thereto. For instance, such rotation of the output shaft may drive commensurate rotation of one or more input shafts of the respective hydraulic components 122, thereby causing activation of the respective hydraulic components 122. It is understood that the paving machine 102 may also include one or more clutches or other variable torque components connected between the output shaft of the power source 110 and the input shafts of the respective hydraulic components 122. In such examples, such clutches may facilitate variable activation of the respective hydraulic components 122 while the power source 110 is operable. The paving machine 102 may further include one or more vibration components connected to the screed portion 124, various motors or other actuators connected to the auger assembly 116, the conveyor system 114, and/or other additional components 210. Any such additional components 210 may be operably connected to the controller 148, and may be activated by the controller 148 based on one or more signals, instructions, and/or other information received from the controller 140.

In some examples, the paving machine 102 may also include one or more generators 208 connected to the output shaft of the power source 110, and operably connected to the controller 148. For example, the paving machine 102 may include an integrated generator having a rotor, an input shaft, and/or other component coupled to the output shaft of the power source 110. In such examples, rotation of the output shaft of the power source 110 may drive commensurate rotation of such a rotatable component of the generator 208, and such rotation of the rotatable component of the generator 208 may cause the generator 208 to generate electrical power. The electrical power generated by the generator 208 may be stored in one or more batteries (not shown) or other storage devices operably connected to the generator 208. Additionally and/or alternatively, electrical power generated by the generator 208 may be directed to the heating system 130 and/or other electronic components of the paving machine 102. For example, electrical power generated by the generator 208 may be directed to the heating system 130 in order to increase the temperature of the one or more electronic heat plates, heat coils, or other components configured to increase the temperature of the screed plate 128 to its desired operating temperature. In any of the examples described herein, the generator 208 may also provide electrical power to one or more of the sensors 149, the controller 148, various lighting assemblies of the paving machine 102, and/or other electronic components thereof. Further, in some examples, activation of the generator 208 may cause commensurate activation of the power source 110. In particular, activation of the generator 208 may cause the power source 110 to operate at or above a predetermined RPM threshold. In some examples, such an RPM threshold may be equal to approximately 1200 RPM. In further examples, on the other hand, such an RPM threshold may be greater than or less than 1200 RPM.

In some examples, the paving machine 102 may also include an alarm system 212 operably connected to the controller 148. For example, the alarm system 212 may include one or more speakers or other devices configured to output an audible sound, tone, and/or other alarm, in response to one or more signals received from the controller 148. The alarm system 212 may also include one or more displays, lighting assemblies, and/or other components configured to output a visual alarm, message, or other indicia in response to one or more signals received from the controller 148. In any of the examples described herein, the alarm system 212 may be configured to output audible, and/or visual indicia indicating that one or more unknown objects is disposed within an area surrounding the paving machine 102. For example, in situations in which the one or more sensors 149 detect an object disposed within a field of view thereof and/or within any other area surrounding the paving machine 102, the one or more sensors 149 may provide one or more signals or other information to the controller 148 and/or to the controller 140 indicative of the detected object. Based at least in part on one or more such signals, the controller 148 and/or the controller 140 may cause the alarm system 212 to output one or more corresponding audible and/or visual alarms. For instance, based at least in part on information received from the one or more sensors 149, the controller 140 may provide instructions to the controller 148 via the network 144. In such examples, execution of such instructions by the controller 148 may cause the controller 148 to control the alarm system 212 to output one or more corresponding audible and/or visual alarms. In any of the examples described herein, the various audible, and/or visual alarms output by the alarm system 212 may comprise a safety measure useful in avoiding activation of the various components of the paving machine 102 while one or more unknown objects are disposed proximate the paving machine 102.

In any of the examples described herein, the paving machine 102 and/or other machines of the paving system 100 may also include one or more removable electronic components 214. For example, such removable electronic components 214 may comprise one or more sonic feed sensors, grades sensors, slope sensors, pendant sensors and/or controls associated with the screed portion 124, lighting assemblies, thermal imagers, and/or other sensors, controls, or electronic devices. In some examples, the removable electronic components 214 may include one or more of the sensors 149 described above. In any of the examples described herein, such removable electronic components 214 may be disconnected from the controller 148 and/or from the paving machine 102 at the end of a workday, and may be disposed in a secure location until they are reconnected to the controller 148 and/or the paving machine 102. Disconnecting such removable electronic components 214. In this way, embodiments may prevent damage and/or theft of such components while the paving machine 102 is not in use.

In any of the examples described herein, disconnecting the removable electronic components 214 from, for example, the paving machine 102 may include disconnecting the removable electronic components 214 from a power circuit 216 of the paving machine 102. For example, the power circuit 216 may comprise an electrical circuit configured to provide electrical power to various electronic components of the paving machine 102. In such examples, the power circuit 216 may include the generator 208, one or more batteries (not shown), and/or other components configured to store electrical power. In such examples, the power circuit 216 may be configured to provide electrical current to, for example, the controller 148, the communication device 136, the sensor 149, the alarm system 212, and/or one or more of the removable electronic components 214. The power circuit 216 may also include a switching system 218 configured to electronically decouple the removable electronic components 214 from the power circuit 216 without, for example, powering down (e.g., turning off) the entire paving machine 102. For example, the switching system 218 may enable the removable electronic components 214 to be connected, and/or disconnected to the power circuit 216 during operation of the paving machine 102 without causing damage to the removable electronic components 214 caused by static discharge, arc flashes, and/or other harmful electrical power surges.

With continued reference to FIG. 2, the compaction machine 172 may include one or more components that are similar to and/or the same as the components described above with respect to the paving machine 102. For example, as shown schematically in FIG. 2 and as noted above, the compaction machine 172 may include a controller 180, a power source 176, one or more hydraulic components 178, one or more vibration components 182, a communication device 136, and/or one or more sensors 149. In such examples, the hydraulic components 178 of the compaction machine 172 may include one or more hydraulic pumps 220, oil pumps 222, coolant pumps 224, and/or other hydraulic components configured to provide desired functionality to the compaction machine 172. For example, such hydraulic components 178 may also include one or more hydraulic cylinders, hydraulic actuators, propulsion pumps, fan pumps, and/or one or more additional pumps connected to a moveable component of the compaction machine 172. As with the paving machine 102, in any of the examples described herein the hydraulic pump 220, oil pump 222, coolant pump 224, and/or any of the other hydraulic components 178 may be coupled to, driven by, and/or otherwise connected to the power source 176. For example, any of the hydraulic components 178 described herein may be coupled to an output shaft and/or other driven component of the power source 176. In such examples, activation of the power source 176 and/or other operation of the power source 176 causing rotation of such an output shaft thereof, may cause commensurate activation of the one or more hydraulic components 178 connected thereto. It is understood that the compaction machine 172 may also include one or more clutches or other variable torque components connected between the output shaft of the power source 176 and the input shafts of the respective hydraulic components 178. In such examples, such clutches may facilitate variable activation of the respective hydraulic components 178 while the power source 176 is operable. The compaction machine 172 may further include one or more lighting assemblies, various motors, actuators, and/or other additional components 226. Any such additional components 226 may be operably connected to the controller 180, and may be activated by the controller 180 based on one or more signals, instructions, and/or other information received from the controller 140.

In some examples, the compaction machine 172 may also include an alarm system 228 that is substantially similar to and/or the same as the alarm system 212 described above with respect to the paving machine 102. The compaction machine 172 may further include one or more removable electronic components 230. For example, such removable electronic components 234 may comprise one or more grade sensors, slope sensors, lighting assemblies, thermal imagers, and/or other sensors, controls, or electronic devices. One or more such removable electronic components 230 may be similar to and/or the same as the removable electronic components 214 described above with respect to the paving machine 102. Additionally, in any of the examples described herein, such removable electronic components 230 may be disconnected from the controller 180 and/or from the compaction machine 172 at the end of a workday, and may be disposed in a secure location until they are reconnected to the controller 180 and/or the compaction machine 172. Disconnecting the removable electronic components 230 from, for example, the compaction machine 172 may include disconnecting the removable electronic components 230 from a power circuit 232 of the compaction machine 172. For example, similar to the power circuit 216, the power circuit 232 of the compaction machine 172 may comprise an electrical circuit configured to provide electrical power to various electronic components of the compaction machine 172. In such examples, power circuit 232 may also include a switching system 234 configured to electronically decouple the removable electronic components 230 from the power circuit 232 without, for example, powering down (e.g., turning off) the compaction machine 172.

FIGS. 3-6 provide schematic illustrations of example user interfaces generated by the user interface engine 200 and provided via a display of the electronic device 142. Such example user interfaces may be displayed and/or otherwise provided by the electronic device 142 in order to facilitate activation of one or more components of the paving machine 102, the compaction machine 172, the cold planer 152, and/or other machines of the paving system 100. For example, such user interfaces may be provided to a user of the electronic device 142 to enable the user to activate one or more such components while the electronic device 142 and/or the user is disposed remote from the worksite 101 and/or remote from the one or more machines of the paving system 100.

Figure 3:
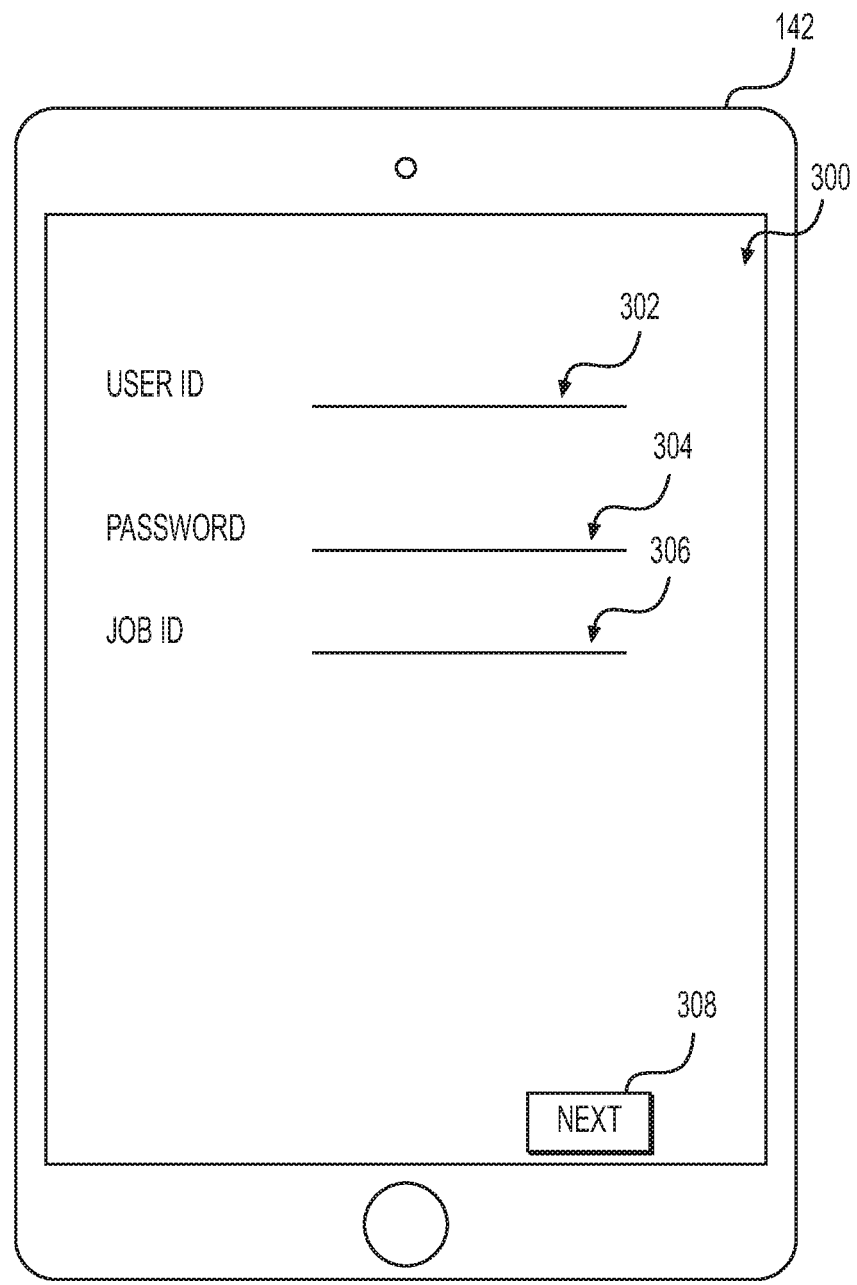
FIG. 3 is a schematic illustration of a first user interface, in accordance with an example embodiment of the present disclosure.

As shown in FIG. 3, an example user interface 300 of the present disclosure may include one or more input fields configured to receive text input, touch input, a voice input, and/or other input from the user. For example, the user interface 300 may include an input field 302 configured to receive touch input, text input, and/or other input from the user indicative of a user identification (hereinafter, "User ID") that is unique to the user. Such a user ID may comprise, for example, a numerical, text-based, or alphanumeric code uniquely identifying the user. User interface 300 may also include an input field 304 configured to receive touch input, text input, and/or other input from the user indicative of a unique password of the user. The password may also comprise a numerical, and text-based, or alphanumeric code uniquely identifying the user, and the user ID may be associated with such a password in a database stored in memory of the electronic device 142 and/or stored in a memory associated with the controller 140. In this way, the user ID and password may facilitate two-part authentication and/or identification of the user. The user interface 300 may also include an input field 306 configured to receive touch input, text input, and/or other input from the user indicative of a unique job identification (hereinafter, "Job ID"). Such a job ID may comprise, for example, a numerical, text-based, or alphanumeric code uniquely identifying a worksite, job, task, and/or other operation that the user is associated with. The user interface 300 may further include one or more controls 308 configured to receive touch input, text input, and/or other input from the user indicative of a request to proceed to a further page, and/or a further user interface. For example, upon receiving a touch input via the control 308, the user interface engine 200 may generate an additional user interface, such as the example user interface 400 illustrated in FIG. 4.

Figure 4:
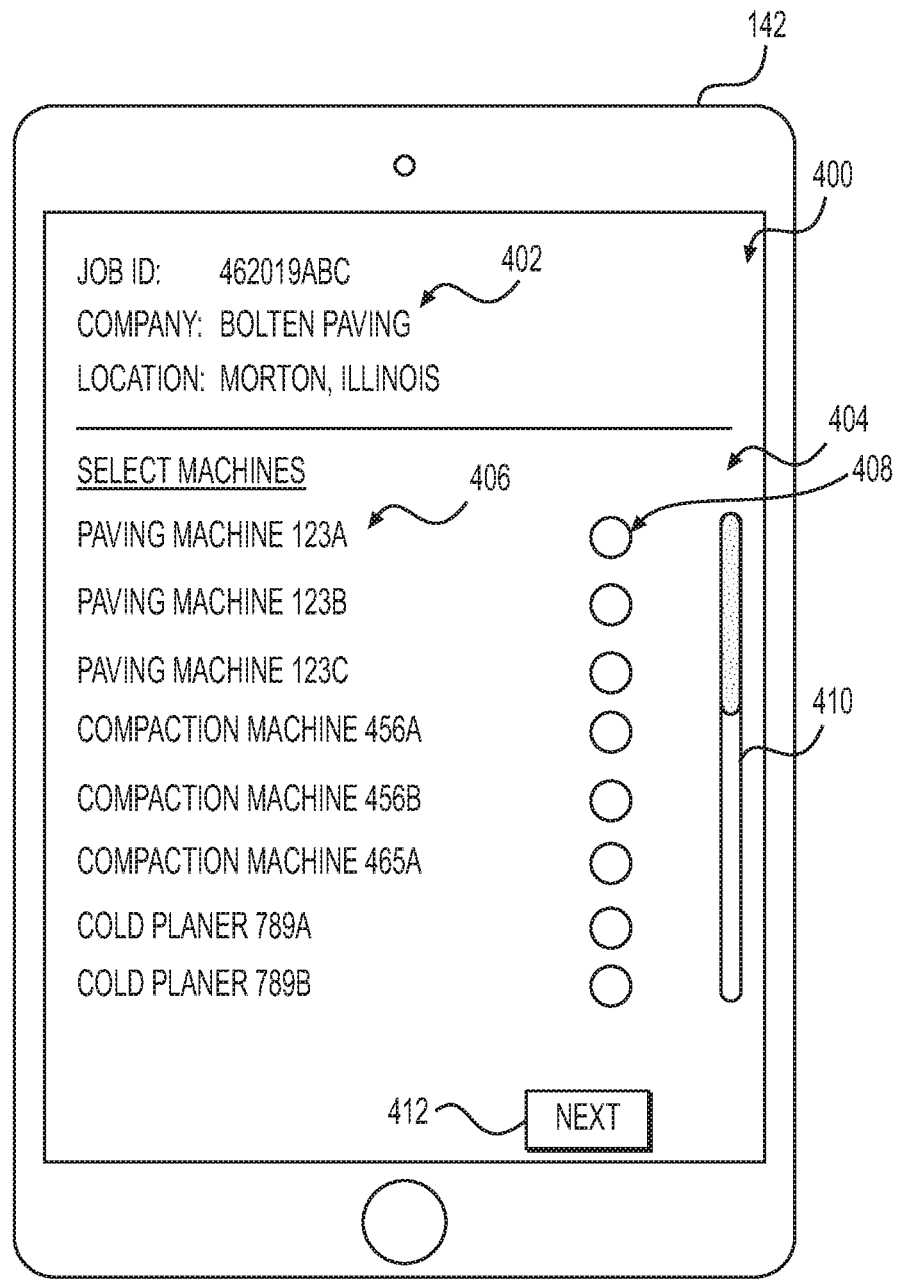
FIG. 4 is a schematic illustration of a second user interface, in accordance with an example embodiment of the present disclosure.

As shown in FIG. 4, an additional user interface 400 of the present disclosure may include, provide, display, and/or otherwise present information 402 associated with the job ID entered using the input field 306. For example, such information 402 may include the job ID itself, the name of the paving, construction, mining, agriculture, and such, or other company sponsoring the particular job identified by the job ID, the location of the worksite 101, where the particular job identified by the job ID is being performed, and/or other information. For example, although not illustrated in FIG. 4, such information 402 may further include the name, user ID, and/or other information associated with the user.

Such a user interface 400 may be utilized by the user in a variety of different applications. The user interface 400 may include a portion 404 configured to enable the user to select one or more machines of the paving system 102 disposed at the worksite 101. In some examples, such a selection may be indicative of a request by the user to activate one or more components of the selected machines while the electronic device 142 and/or the user is disposed remote from the worksite 101 and/or remote from the one or more machines of the paving system 100. For example, the portion 404 of the user interface 400 may include, provide, display, and/or otherwise present information 406 identifying a plurality of available machines disposed at the worksite 101. As shown in FIG. 4, in some examples, such information 406 may indicate a particular type or classification of machine (e.g., a paving machine, a compaction machine, a cold planer, etc.). Additionally and/or alternatively, such information 406 may indicate a machine identifier uniquely identifying each machine of the plurality of machines. Such a machine identifier may comprise, for example, a numerical, text-based, or alphanumeric code (e.g., 123A, 123B, 123C, etc. as shown in FIG. 4) uniquely identifying the respective machine. As shown in FIG. 4, in some examples, the information 406 may include and/or otherwise indicate a particular type of machine together with a machine identifier for each machine of the plurality of available machines at the worksite 101.

The user interface 400 may also include, provide, display, and/or otherwise present a plurality of input fields 408, and each input field 408 included in the user interface 400 may correspond to a respective one of the plurality of available machines identified by the information 406. Each input field 408 may be configured to receive touch input, text input, and/or other input from the user, and such an input may be indicative of a selection by the user of one or more of the available machines identified by the information 406. It is understood that, upon receiving an input from the user, an input field 408 of the user interface 400 may change color, change shape, change size, change orientation, change location, and/or may otherwise change in visual appearance in order to visually indicate that such an input has been received. In examples in which a significant number of available machines are indicated by the information 406, the user interface 400 may further include a scrollbar, scrubber bar, and/or other tool 410. Such a tool 410 may be configured to receive touch input (e.g., a swipe, a tap, a drag, etc.) and/or other input from the user, and may cause the portion 404 of the user interface 400 to display additional information 406 based at least in part on such input. The user interface 400 may further include one or more controls 412 configured to receive touch input, text input, and/or other input from the user indicative of a request to proceed to a further page, and/or a further user interface. For example, upon receiving a touch input via the control 412, the user interface engine 200 may generate an additional user interface, such as the example user interface 500 illustrated in FIG. 5.

Figure 5:
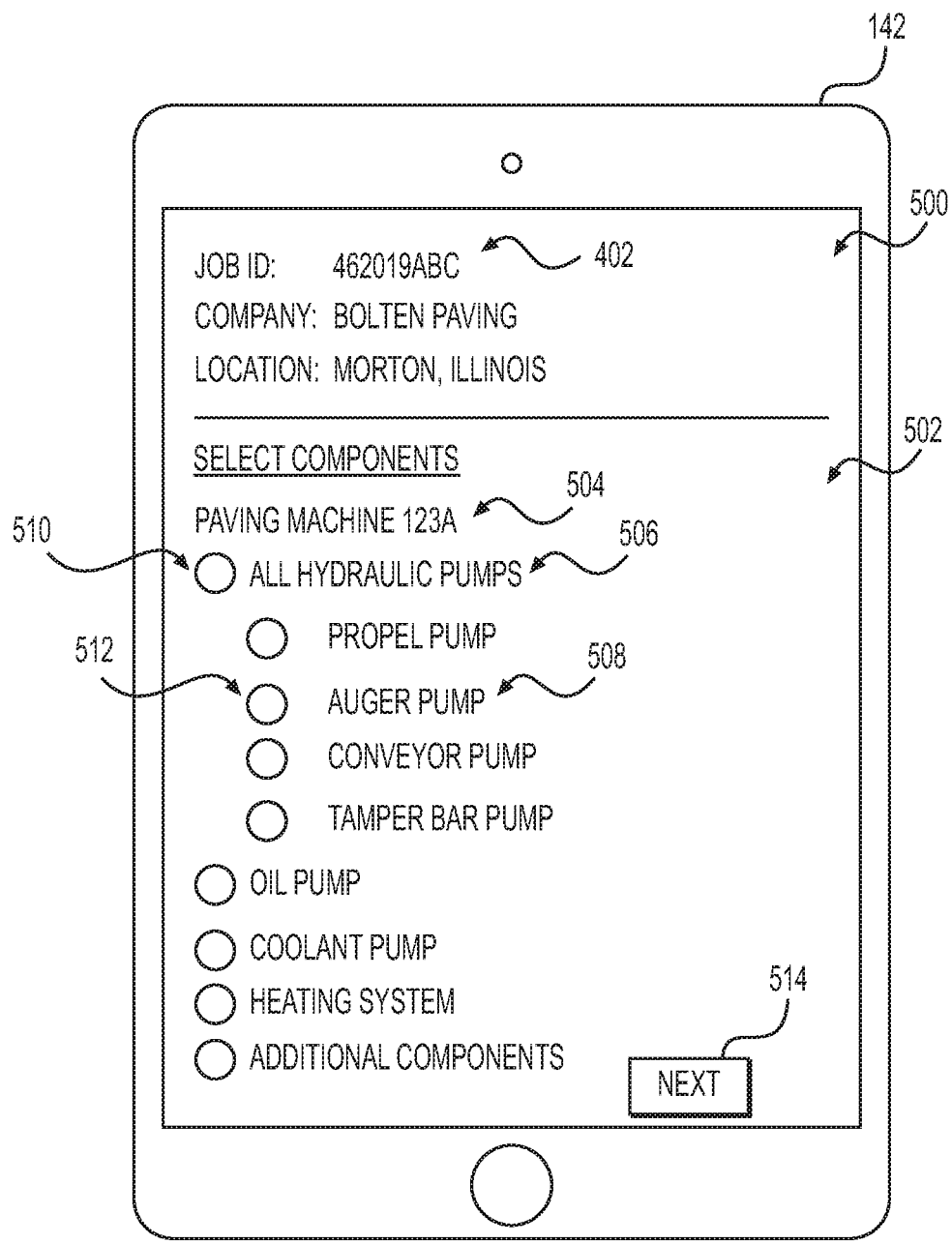
FIG. 5 is a schematic illustration of a third user interface, in accordance with an example embodiment of the present disclosure.

As shown in FIG. 5, the user interface 500 may include a portion 502 configured to enable the user to select one or more components of a machine for activation. For example, the portion 502 of the user interface may enable the user to select one or more components of the respective machine or machines selected via the user interface 400. While FIG. 5 illustrates information associated with a single machine (e.g., paving machine 123A), it is understood that information associated with more than one selected machine may be provided via the user interface 500. Thus, the user interface 500 may enable the user to select components of a plurality of different machines, and each such selection may be indicative of a request by the user to activate the corresponding machine component while the electronic device 142 and/or the user is disposed remote from the worksite 101 and/or remote from the one or more machines of the paving system 100.

For example, the portion 502 of the user interface 500 may include, provide, display, and/or otherwise present information 504 identifying the one or more machines (e.g., paving machine 123A) selected via the user interface 400. The portion 502 of the user interface 500 may also include, provide, display, and/or otherwise present information 506, 508 identifying one or more components of the particular machine. As shown in FIG. 5, in some examples, such information 506 may identify a plurality, grouping, or category of machine components based on type, component location, etc. (e.g., all hydraulic pumps, all electronic components, all heating components, all vibration components, etc.). Such information 508 may also specifically indicate a particular machine component (e.g., the power source 110, a propulsion pump, an auger pump, a conveyor pump, a tamper bar pump, an oil pump, a coolant pump, etc.). In some examples, such information 508 may also identify other component groupings or systems associated with the selected machine (e.g., heating system, additional components, etc.). It is understood that while the example illustration of FIG. 5 includes information 508 individually indicating particular machine components (a propulsion pump, an auger pump, a conveyor pump, etc.), in some examples, such machine components may each be coupled to a drive shaft and/or other output component of the power source 110. In such examples, activating the power source 110 may drive and/or otherwise cause commensurate activation of all such machine components. Accordingly, in such examples the user interface 500 may provide information 508 identifying and/or indicating the power source 110, and may omit information individually indicating one or more of the particular machine components directly and/or otherwise coupled thereto. Omitting such information from the portion 502 of the user interface 500 may simplify the user interface 500 and, thus, may further increase efficiency of the paving system 100.

The user interface 500 may also include, provide, display, and/or otherwise present a plurality of input fields 510, 512, and each input field 510, 512 included in the user interface 500 may correspond to a respective one of the plurality of available machine components identified by the information 506, 508. Each input field 510, 512 may be configured to receive touch input, text input, and/or other input from the user, and such an input may be indicative of a selection by the user of one or more of the components identified by the information 506, 508. Similar to the input fields 408 described above with respect to the user interface 400, upon receiving an input from the user, an input field 510, 512 of the user interface 500 may change color, change shape, change size, change orientation, change location, and/or may otherwise change in visual appearance in order to visually indicate that such an input has been received. As noted above, in some examples the user interface 500 may provide information 508 identifying and/or indicating the power source 110, and may omit information individually indicating one or more of the particular machine components directly and/or otherwise coupled thereto. Although not illustrated in FIG. 5, in such examples, the user interface 500 may include an input field 510, 512 corresponding to the power source 110. Receiving an operator input via such an input field 510, 512 may cause activation of the power source 110, and may also cause commensurate activation of the various machine components directly and/or otherwise coupled to the power source 110.

Although not illustrated in FIG. 5, in some examples the user interface 500 may further include a scrollbar, scrubber bar, and/or other tool configured to receive touch input (e.g., a swipe, a tap, a drag, etc.) and/or other input from the user. Such a tool may cause the portion 502 of the user interface 500 to display additional information 504, 506, 508 based at least in part on such input. The user interface 500 may further include one or more controls 514 configured to receive touch input, text input, and/or other input from the user indicative of a request to proceed to a further page, and/or a further user interface. For example, upon receiving a touch input via the control 514, the user interface engine 200 may generate an additional user interface, such as the example user interface 600 illustrated in FIG. 6.

Figure 6:
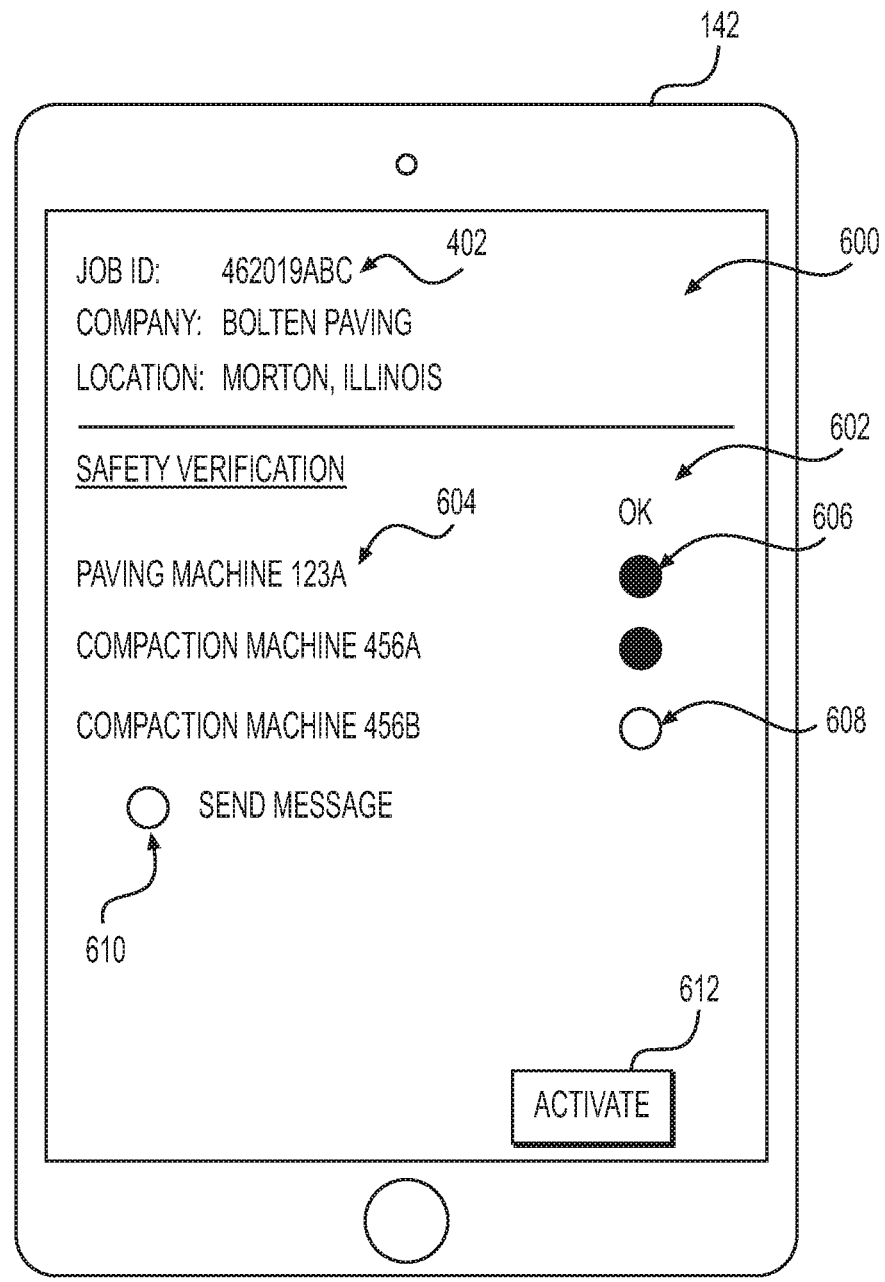
FIG. 6 is a schematic illustration of a fourth user interface, in accordance with an example embodiment of the present disclosure.

As shown in FIG. 6, the user interface 600 may include a portion 602 associated with performing a safety verification prior to activating certain components of the selected machines. For example, as noted above, the user interface 400 may enable a user to select one or more machines of the paving system 100 disposed at the worksite 110. In any such example, a processor, the machine control engine 141, and/or other components of the controller 140 may provide instructions to a controller of the one or more selected machines (e.g., the controller 148 of the paving machine 102, the controller 180 of the compaction machine 172, etc.). When executed by a controller of the selected machine, such instructions may cause the controller to control the one or more sensors to sense an area surrounding the machine. The one or more sensors 149 may provide one or more signals and/or other information to the controller 140 indicative of the area surrounding the machine, and the controller 140 may determine whether the area surrounding the machine includes one or more unknown objects based at least in part on such information. The user interface 600 illustrates an example in which the controller 140 has determined that a first area surrounding a particular selected paving machine 123A and a second area surrounding a particular selected compaction machine 456A are free from unknown objects, but where the controller 140 has determined that a third area surrounding a particular selected compaction machine 456B includes an unknown object.

For example, the portion 602 of the user interface 600 may include, provide, display, and/or otherwise present information 604 identifying the one or more machines (e.g., paving machine 123A, compaction machine 456A, and compaction machine 456B) selected via the user interface 400. The portion 602 of the user interface 600 may also include, provide, display, and/or otherwise present respective icons, symbols, images, text, visual indicia, and/or other indications 606 indicating that the first area surrounding the selected paving machine 123A and the second area surrounding the selected compaction machine 456A are free from unknown objects. While the indications 606 illustrated in FIG. 6 comprise colored circles, in other examples, such indications 606 may comprise check marks, colored boxes, one or more words (e.g., "no objects present," "safe," "ok," etc.) or other visual indicia indicating that the respective areas are free from such objects, and that the selected components of each respective machine may be activated without risk of damage or harm to the respective machine, or to items, persons, or other objects disposed at the worksite 101. The portion 602 of the user interface 600 may further include, provide, display, and/or otherwise present respective icons, symbols, images, text, visual indicia, and/or other indications 608 indicating that the third area surrounding the selected compaction machine 456B includes an unknown object. While the indication 608 illustrated in FIG. 6 comprises an empty circle, in other examples, such an indication 608 may comprise an "X", a colored box, one or more words (e.g., "object present," "stop," "see foreman," etc.) or other visual indicia indicating that the respective area includes at least one unknown object. In such examples, the controller 140 may prohibit activation of the selected components of the corresponding machine so that risk of damage or harm to the respective machine, or to the object may be avoided. It is also understood that in some examples, various other colors (e.g., green as an indication that the area surrounding the selected machine is free from unknown objects, and red as an indication that the area surrounding the selected machine includes at least one unknown object), shapes, audible alarms, symbols, or other indications 606, 608 may be presented via the user interface 600 of the electronic device 142 based at least in part on determinations made by the controller 140 using information received from one or more of the sensors 149 described herein.

The user interface 600 may also include, provide, display, and/or otherwise present one or more input fields 610 configured to receive touch input, text input, and/or other input from the user. For instance, in examples in which the controller 140 has determined that an area surrounding a particular selected machine (e.g., compaction machine 456B) includes an unknown object, the user interface 600 may provide at least one input field 610 corresponding to the respective machine. In the example illustrated in FIG. 6, the input field 610 may be configured to receive an input from the user indicative of a request by the user to send a message to a foreman associated with the current job, a back-end office, and/or to one or more additional operators. Such a message may contain information indicating that, among other things, the controller 140 has identified and/or otherwise determined the presence of an unknown object within an area surrounding the particular machine. Similar to the input fields 408 described above with respect to the user interface 400, upon receiving an input from the user, the input field 610 of the user interface 600 may change color, change shape, change size, change orientation, change location, and/or may otherwise change in visual appearance in order to visually indicate that such an input has been received. The user interface 600 may further include one or more controls 612 configured to receive touch input, text input, and/or other input from the user indicative of a request to proceed to a further page, a further user interface, and/or to commence activation of the selected machine components. For example, upon receiving a touch input via the control 612, the activation engine 143 may provide a corresponding signal to the machine control engine 141, and such a signal may include information indicative of a request to activate the one or more machine components selected via, for example, user interface 500. The machine control engine 141 may provide one or more signals, instructions, and/or other information to the controllers (e.g., a controller 148, a controller 180, etc.) of the respective machines based at least in part on such a signal received from the activation engine 143. When executed by the controllers of the respective machines, the instructions may cause the controllers to energize, direct power to, actuate, and/or otherwise activate the selected components of the respective machines. Because such activation may occur while the user and/or the electronic device is located remote from the worksite 101 and/or remote from the respective machines, machine start-up time may be reduced, operator downtime may be minimized, and the overall efficiency of the paving system 100 may be improved.

Figure 7:
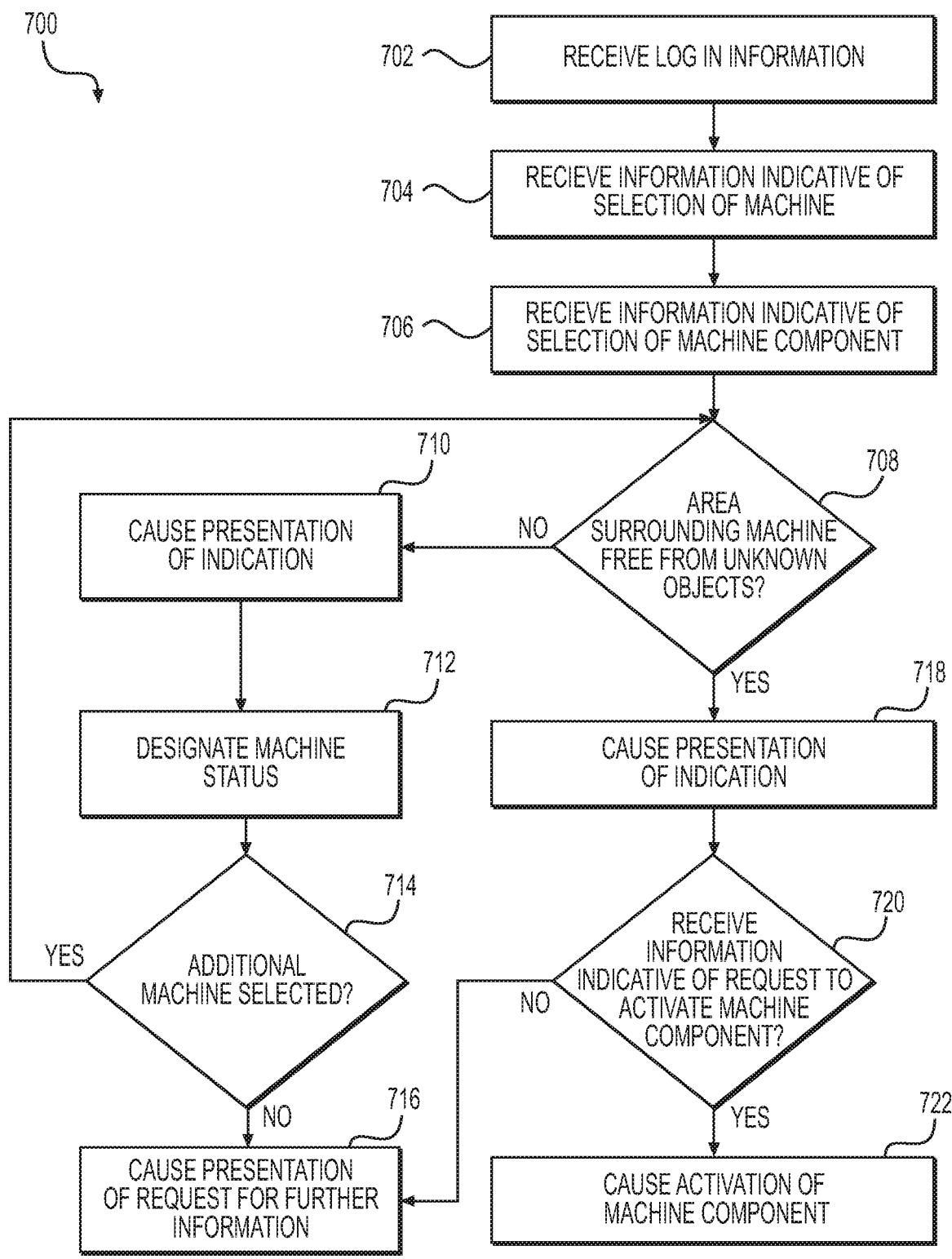
FIG. 7 is a flow chart depicting a method in accordance with an example embodiment of the present disclosure.

FIG. 7 illustrates a flow chart depicting a method 700 in accordance with an example embodiment of the present disclosure. The example method 700 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 140, the electronic device 142, the controller 148 of the paving machine 102, the controller 156 of the cold planer 152, the controller 180 of the compaction machine 172, and/or other components of the paving system 100, such instructions may cause the one or more controllers, and/or various components of the paving machine 102 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 700 is described with reference to the paving system 100 and/or the paving machine 102 of FIG. 1. For example, unless otherwise noted below, the method 700 is described with respect to one or more processors, the machine control engine 141, and/or other components of the controller 140.

Further, it is understood that any of the operations described with respect to FIG. 7 may be performed by the paving machine 102, the compaction machine 172, the cold planer 152, and/or other components of the paving system 100 in a manual operating mode, in an autonomous operation mode, and/or in semi-autonomous operating mode. By way of example, in an autonomous operating mode, the controller 148 of the paving machine 102, the controller 140, the one or more electronic devices 142, and/or other components of the paving system 100 in communication with the paving machine 102 may control one or more operations of the paving machine 102 automatically and/or without input from an operator of the paving machine 102. In such examples, the paving machine 102 may comprise an autonomous paving machine of the paving system 100. In an example semi-autonomous operating mode, on the other hand, the controller 148 of the paving machine 102, the controller 140, the one or more electronic devices 142, and/or other components of the paving system 100 in communication with the paving machine 102 may control one or more operations of the paving machine 102 based at least in part on one or more inputs from an operator of the paving machine 102.

With reference to FIG. 7, at 702 the controller 140 of the paving system 100 may receive various information from one or more sources associated with the paving system 100. For example, at 702 the controller 140 may receive a login ID, a user name, a password, a company name, a worksite name, a worksite location, a job ID associated with the worksite 101, and/or other information from the electronic device 142 and via the network 144. In some examples, the information received by the controller 140 at 702 may be provided by a user of the electronic device 142 via the one or more input fields 302, 304, 306 of the user interface 300 illustrated in FIG. 3. At 702, the controller 140 may correlate at least some of this information with corresponding information stored in a database, user listing, worksite listing, password listing, job ID listing, and/or other component of memory associated with the controller 140. In such examples, additional information identified in various portions of the method 700 may be received by the controller 140, based at least in part on receipt of the long and ID, password, job ID, and/or other information received at 702. For instance, the controller 140 may require that a user of the electronic device 142 provide acceptable login information and/or other information at 702 before further information may be received by the controller 140.

At 704, the controller 140 of the paving system 100 may receive information indicative of a selection of one or more machines disposed at the worksite 101. In such examples, the information received at 704 may be received from the electronic device 142 via the network 144. Further, in such examples, the electronic device 142 may be disposed remote from the worksite 101. For instance, the electronic device 142 may be disposed at a location that is outside of a perimeter of the worksite 101 and/or that is outside of the range of a LAN, WAN, Bluetooth® protocol, NFC protocol, or other relatively short-range communication protocol. For instance, in various examples, the electronic device 142 may be disposed one or more miles away from a perimeter of the worksite 101 and/or from one or more selected machines of the paving system 100. In such examples, at 704, the electronic device 142 may be in communication with at least the controller 144 via an internet communication protocol or other relatively long-range wireless network 144. In any of the examples described herein, the information received by the controller 140 at 704 may be provided by a user of the electronic device 142 via the one or more input fields 408 of the user interface 400 illustrated in FIG. 4.

For example, at 704 the controller 140 may send instructions to the user interface engine 200 of the electronic device 142 and/or may otherwise cause information 406 identifying a plurality of available machines disposed at the worksite 101 to be presented via the electronic device 142. Additionally, at 704 the controller 140 may send instructions to the user interface engine 200 and/or may otherwise cause a plurality of input fields 408 to be presented via the electronic device 142. As described above with respect to the user interface 400, in some examples, each input field 408 of the plurality of input fields may correspond to a respective one of the plurality of available machines identified by the information 406. Further, the selection indicated by the information received at 704 may be provided by the user, as an input, via one or more such input fields 408.

At 706, the controller 140 may receive information indicative of a selection of one or more machine components. In such examples, the information received at 706 may be received from the electronic device 142 via the network 144. Further, the selected machine components may comprise components of the respective machines identified by the information received at 704. For example, at 706 the controller 140 may send instructions to the user interface engine 200 of the electronic device 142 and/or may otherwise cause information 506, 508 identifying a plurality of components of the respective selected machines to be presented via the electronic device 142. Additionally, at 706 the controller 140 may send instructions to the user interface engine 200 and/or may otherwise cause a plurality of input fields 510, 512 to be presented via the electronic device 142. As described above with respect to the user interface 500, in some examples, each input field 510, 512 may correspond to a respective one of the selected machines identified by the information 504. Further, the selection indicated by the information received at 706 may be provided by the user, as an input, via one or more such input fields 510, 512.

At 708, the controller 140 may determine whether an area surrounding the machine (e.g., a paving machine 102) is free from one or more unknown objects. For example, at 708 the controller 140 may receive one or more signals from a sensor 149 connected to the machine. Such signals may contain data or other information indicative of an area surrounding the machine. As noted above, such an area may be defined by, for example, a field of view of the sensor 149, and/or by a combined field of view of a plurality of sensors 149 connected to the machine. In such examples, at 708 the controller 140 may process information included in such signals utilizing one or more image recognition programs, facial recognition programs, collision avoidance programs, and/or other hardware and/or software components to determine whether one or more humans, worksite structures, additional machines, and/or other objects are disposed within the area surrounding machine. In some examples, such an area may comprise a substantially circular area, extending at least 10 feet from the perimeter of the machine in all directions. In other examples, such an area may be substantially rectangular, substantially square, and/or any other shape. Additionally, such an area may extend greater than or less than approximately 10 feet from the perimeter of the machine in all directions.

As shown in FIG. 7, based at least in part on determining that the area surrounding the selected machine includes an unknown object (Step: 708—No), the controller 140 may, at 710, cause an indication that the area surrounding the machine includes such an unknown object to be presented via the electronic device 142. Such an example indication 608 is illustrated in the user interface 600 of FIG. 6 in association with the selected compaction machine 456B.

At 712, the controller 140 may also designate a particular status of such a machine (e.g., the selected compaction machine 456B) based at least in part on determining that the area surrounding the selected machine includes such an unknown object. In such examples, the status designated at 712 may comprise a "do not activate" status and/or any other status causing a controller of the machine (e.g., the controller 180 of the compaction machine 456B) to prohibit activation of one or more components of the selected machine in order to avoid damage to the machine itself and/or harm to the one or more objects disposed in the area surrounding the machine. In such examples, the controller 140 may store the status designated at 712 within one or more databases and/or other memory components thereof. Additionally and/or alternatively, at 712 the controller 140 may provide one or more signals to the controller of the machine (e.g., the controller 180 of the compaction machine 456B) to prohibit activation of one or more components of the selected machine.

At 714, the controller 140 may determine whether one or more additional machines have been selected by the user via the user interface 400. In examples in which no additional machines have been selected by the user via the user interface 400 (Step: 714—No), at 716 the controller 140 may cause a request for further information to be presented via the electronic device 142. For example, at 716, the controller 140 may provide one or more signals to the user interface engine 200 containing instructions which, when executed by the user interface engine 200 and/or other components of the electronic device 142, cause the user interface engine 200 to provide an additional user interface via the electronic device 142 confirming whether the user wishes to select one or more additional machines and/or whether the user wishes to logout. Such an additional user interface may also include one or more input fields configured to receive various inputs from the user, and the user interface engine 200 may be configured to take various additional actions (e.g., provide the user interface 400, provide a logout screen, etc.) according to inputs received from the user via such input fields. Alternatively, in examples in which one or more additional machines have been selected by the user via the user interface 400 (Step: 714—Yes), controller 140 may proceed to Step: 708.

As shown in FIG. 7, based at least in part on determining that the area surrounding the selected machine is free from unknown objects (Step: 708—Yes), the controller 140 may, at 718, cause an indication that the area surrounding the machine is free from unknown objects to be presented via the electronic device 142. Such an example indication 606 is illustrated in the user interface 600 of FIG. 6 in association with the selected compaction machine 456A and the selected paving machine 123A. As noted above, the user interface 400 may enable a user to select a plurality of available machines available for use at the worksite 101. Accordingly, in any of the examples described herein, the actions and/or other features associated with at least Steps 704-722 of the method 700 may be performed for each of the selected machines.

At 720, the controller 140 may determine whether information indicative of a request to activate one or more selected machine components has been received. For example, at 720 the controller 140 may determine whether one or more signals containing information indicative of a request to activate one or more machine components has been received from the electronic device 142 via the network 144. As described above with respect to FIG. 6, the control 612 of the user interface 600 may be configured to receive a touch input or other input from a user indicative of such a request. Upon receiving such an input, the activation engine 143 and/or other components of the electronic device 142 may provide one or more signals to the controller 140 via the network 144, and such signals may include information indicative of a request to activate the one or more selected machine components.

If, at 720, the controller 140 determines that information indicative of a request to activate one or more selected machine components has not been received (Step: 720—No), the controller 140 may proceed to Step: 716. As described above, at 716 the controller 140 may cause a request for further information to be presented via the electronic device 142. However, if at 720 the controller 140 determines that information indicative of a request to activate one or more selected machine components has been received (Step: 720—Yes) the controller 140 may proceed to Step: 722.

At 722, the controller 140 may cause activation of the one or more selected machine components. For example, based at least in part on receiving an input via the control 612, the activation engine 143 and/or other components of the electronic device 142 may provide one or more signals to the machine control engine 141 and/or other components of the controller 140. At 722, the controller 140 may receive such signals and may provide one or more signals to the controller of the selected machine (e.g., the controller 148 of the paving machine 102). The signals provided to the controller of the selected machine may include instructions which, when executed by the controller (e.g., the controller 148), may cause the controller to provide power to, actuate, and/or otherwise activate such selected components. For instance, in examples in which the selected components comprise one or more of the hydraulic components 122, the controller 148 of the paving machine 102 may cause activation of the power source 110, which may drive activation of the one or more hydraulic components 122. Additionally or alternatively, in examples in which the selected components comprise a heat plate, a heating coil, or other components of the heating system 130, the controller 148 of the paving machine 102 may cause activation of the power source 110, which may drive activation of the generator 208. In such example, once activated, the generator 208 may direct power to the one or more components of the heating system 130, causing activation thereof. Accordingly, the example systems and methods of the present disclosure may enable activation of one or more machine components using an electronic device disposed out of range of various local, near-field, or other relatively short-range network protocols.

INDUSTRIAL APPLICABILITY

The present disclosure provides systems and methods for activating machine components at a worksite 101 such as a construction site, a mine site, a paving site, a road repair zone, and/or other such site. In particular, the systems and methods of the present disclosure may be used to activate selected machine components from a location outside of relatively short-range network protocols. The various systems and methods described herein may be used to minimize the amount of start-up time required for such components to reach a desired operating temperature, and thus, may minimize operator downtime and improve overall system efficiency.

As noted above with respect to FIGS. 1-7, an example method of the present disclosure may include receiving, with the controller 140, information indicative of a selection of a machine disposed at the worksite 101. The controller 140 may receive such information from, for example, an electronic device 142 disclosed remote from the worksite 101 and via a network 144. For example, such information may correspond to an input received via one or more input fields 408 of the user interface 400 described above. Such a method may also include receiving, with the controller 140, additional information from the electronic device 142, and such additional information may be indicative of a selection of a component of the machine. For instance, such additional information may correspond to an input received via one or more input fields 510, 512 of the user interface 500 described above.

In some examples, the method may also include receiving, with the controller 140, information from one or more sensors 149 connected to the selected machine, and such information may be indicative of an area surrounding the selected machine. For instance, such one or more sensors 149 may sense a defined area surrounding the selected machine. In such examples, the controller of the selected machine may provide one or more signals to the controller 140, and such signals may include information indicative of the surrounding area. The controller 140 may determine, based at least in part on the information included in such signals, that the area surrounding the machine is free from unknown objects.

Additionally, the controller 140 may receive further information from the electronic device 142, and such information may be indicative of a request to activate the selected component of the machine. Such information may correspond to an input received via the control 612 of the user interface 600 described above. In any of the examples described herein, the controller 140 may cause activation of the selected component based at least in part on the information indicative of the request activate the selected component.

In any of the examples described herein, the electronic device 142 described above may be disposed at a significant distance from the selected machine while the information described above is provided to the controller 140. For example, the electronic device 142 may be disposed outside of the range of a LAN, WAN, Bluetooth® protocol, NFC protocol, or other relatively short-range communication protocol established at the worksite 101. Thus, the example systems and methods described above may reduce the start-up time required for such components, may minimize operator downtime, and may improve overall system efficiency.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving, at a controller that is operably connected with a plurality of machines disposed at a worksite, first information indicative of a first selection of a machine of the plurality of machines, wherein:
   the first information is received, by the controller, from an electronic device, and via a network, the electronic device comprising an activation engine,
   the electronic device is disposed remote from the worksite,
   a machine control engine of the controller is configured to activate a component of the machine in accordance with second information received from the activation engine, without activating one or more other components of the machine, and
   the machine control engine at the controller is further configured to activate components of one or more machines of the plurality of machines, other than the machine;
   receiving the second information with the controller and from the electronic device, wherein:
   the second information is indicative the component of the machine;
   receiving third information with the controller and from the activation engine of the electronic device, wherein the third information is indicative of a request to activate the component; and
   causing activation of the component with the machine control engine at the controller and based at least in part on the third information, without activating the one or more other components of the machine.

2. The method of claim 1, further comprising receiving fourth information with the controller and from the electronic device, wherein:
   the fourth information includes at least one of a login ID, a password, and a job ID associated with the worksite, and
   the first information is received based at least in part on receipt of the fourth information.

3. The method of claim 2, further comprising:
   based on the fourth information, causing information identifying a plurality of available machines disposed at the worksite to be presented via a portion of a user interface; and
   causing a plurality of input fields to be presented via the portion of the user interface, wherein:
   each input field of the plurality of input fields corresponds to a respective one of the plurality of available machines, and
   the first selection of the machine is provided via a first input field of the plurality of input fields.

4. The method of claim 1, further comprising:
   causing a portion of a user interface to be presented via the electronic device based on the first selection; and
   causing a plurality of input fields to be presented via the portion of the user interface, wherein:
   each input field of the plurality of input fields corresponds to a respective one of a plurality of components of the machine available for remote activation.

5. The method of claim 1, wherein the machine comprises at least one of a paving machine and a compaction machine, and the component comprises at least one of a heating system, a hydraulic pump, an oil pump, a coolant pump, and a vibration component.

6. The method of claim 1, wherein:
   causing activation of the component includes causing activation of a power source of the machine, and
   activation of the power source drives activation of a generator at or above a predetermined rotations per minute (RPM) threshold.

7. The method of claim 1, wherein at least one sensor is connected to the machine and comprises at least one of a video camera, an infrared sensor, a thermal sensor, a LIDAR sensor, and a SONAR sensor, and the method further comprises:
   causing an indication that an area surrounding the machine is free from unknown objects to be presented via the electronic device.

8. The method of claim 1, wherein the machine comprises a first machine of the plurality of machines disposed at the worksite, the method further comprising:
   receiving fourth information with the controller and from the electronic device, wherein the fourth information is indicative of a third selection of a second machine of the plurality of machines.

9. The method of claim 8, further comprising:
   determining, with the controller and using a sensor connected to the second machine, that an area surrounding the second machine includes an unknown object; and
   based at least in part on determining that the area surrounding the second machine includes the unknown object, causing an indication that the area surrounding the second machine includes the unknown object to be presented via the electronic device.

10. The method of claim 9, further comprising:
    designating, with the controller, a status of the second machine based at least in part on determining that the area surrounding the second machine includes the unknown object, the status being effective to prohibit activation of a component of the second machine.

11. A paving system, comprising:
a paving machine disposed at a worksite, the paving machine having a first controller, a screed portion, a heating system associated with the screed portion, a power source, and a plurality of hydraulic components driven by the power source; and
a second controller separate from the paving machine and in communication with the first controller via a network, the second controller comprising a machine control engine configured to:
receive first information indicative of a first selection of the paving machine from among a plurality of machines disposed at the worksite, wherein the first information is received via the network from an electronic device comprising an activation engine, wherein the electronic device is disposed remote from the worksite;
receive second information from the activation engine of the electronic device, wherein the second information is indicative of a second selection of a component of the paving machine,
wherein the second selection is made via a portion of a user interface presented on the electronic device, the portion identifying a plurality of components of the paving machine available for remote activation, and
wherein the portion is presented based on the first selection;
receive third information from the electronic device and via the portion, wherein the third information is indicative of a request to activate the component;
receive fourth information from a sensor connected to the paving machine and via the network, wherein the fourth information is indicative of an area surrounding the paving machine; and
activate the component in accordance with the second information received from the activation engine, by providing instructions to the first controller based at least in part on the third information and the fourth information, the instructions being executable by the first controller to activate the component without activating one or more other components of the paving machine.

12. The paving system of claim 11, wherein:
activation of the component includes activation of the power source, and
activation of the power source drives activation of a generator connected to the power source at or above a predetermined rotations per minute (RPM) threshold.

13. The paving system of claim 11, further comprising at least one of a compaction machine and a cold planer, wherein the second controller is further configured to:
receive fifth information from the electronic device, wherein the fifth information is indicative of a third selection of at least one of the compaction machine and the cold planer; and
receive sixth information from the electronic device, wherein the sixth information is indicative of a fourth selection of a component of the at least one of the compaction machine and the cold planer.

14. The paving system of claim 13, wherein the second controller is further configured to:
receive seventh information from a sensor connected to the at least one of the compaction machine and the cold planer; and
designate a status of the at least one of the compaction machine and the cold planer based at least in part on the seventh information, the status being effective to prohibit activation of a component of the at least one of the compaction machine and the cold planer.

15. The paving system of claim 11, wherein the second controller is further configured to cause an indication to be presented via the electronic device based at least in part on the fourth information, the indication indicating that the area surrounding the paving machine is free from unknown objects.

16. A paving machine, comprising:
a first controller;
a screed portion configured to deposit a mat of paving material onto a work surface of a work site;
a heating system associated with the screed portion and operably connected to the first controller;
a power source operably connected to the first controller;
a plurality of hydraulic components driven by the power source;
at least one sensor operably connected to the first controller; and
a communication device operably connected to the first controller, the communication device being in communication with a second controller separate from the paving machine, the second controller comprising a machine control engine configured to:
receive first information from an electronic device disposed remote from the work site and via a network, wherein:
the first information is indicative of a first selection of a component of the paving machine,
the first selection is made via a portion of a user interface presented on the electronic device, the portion identifying a plurality of components of the paving machine available for remote activation, and
the portion is presented based on an input received via an additional portion of the user interface, the additional portion identifying a plurality of machines currently disposed at the work site and in communication with the second controller, and
the input being indicative of a selection of the paving machine from the plurality of machines,
receive second information from an activation engine of the electronic device, wherein the second information is indicative of a request to activate the component without activating one or more other components of the paving machine,
receive third information from the at least one sensor, wherein the third information is indicative of an area surrounding the paving machine, and
provide instructions to the first controller in accordance with the second information received from the activation engine, wherein the instructions are based at least in part on the first information, the second information, and the third information, wherein:
the first controller is configured to execute the instructions, and
execution of the instructions by the first controller causes the first controller to activate the component without activating the one or more other components of the paving machine.

17. The paving machine of claim 16, wherein the at least one sensor is connected to the paving machine and comprises at least one of a video camera, an infrared sensor, a thermal sensor, a LIDAR sensor, and a SONAR sensor.

18. The paving machine of claim 16, further comprising a generator connected to the power source and operably connected to the heating system, wherein activation of the power source drives activation of the generator at or above a predetermined rotations per minute (RPM) threshold.

19. The paving machine of claim 16, wherein:
the plurality of hydraulic components comprises a hydraulic pump, an oil pump, and a coolant pump,
the portion of the user interface identifying the plurality of components of the paving machine includes an input field corresponding to each respective component of the plurality of components,
each input field is configured to change, in visual appearance, to indicate receipt of a corresponding input,
the additional portion of the user interface is presented based on receipt, via the user interface, of at least one of a login ID, a password, and a job ID, and
the plurality of machines is identified, in the additional portion of the user interface, in association with at least one of the job ID and information associated with the job ID.

20. The paving machine of claim 16, wherein the second controller is further configured to:
determine, based at least in part on the third information, that the area surrounding the paving machine is free from unknown objects; and
based at least in part on determining that the area surrounding the paving machine is free from unknown objects, cause an indication that the area surrounding the paving machine is free from unknown objects to be presented via the electronic device.

* * * * *